United States Patent
Kolodizner et al.

(10) Patent No.: US 9,479,727 B1
(45) Date of Patent: Oct. 25, 2016

(54) CALL RECORDING WITH SCREEN AND AUDIO CORRELATION

(71) Applicant: NICE-SYSTEMS LTD., Ra'anana (IL)

(72) Inventors: Efim Kolodizner, Ashdod (IL); Tal Zur, Rishon-Lezion (IL)

(73) Assignee: NICE-SYSTEMS Ltd., Ra'anana (IL)

( * ) Notice: Subject to any disclaimer, the term of this patent is extended or adjusted under 35 U.S.C. 154(b) by 0 days.

(21) Appl. No.: 14/799,695

(22) Filed: Jul. 15, 2015

(51) Int. Cl.
   *H04N 7/14* (2006.01)
   *H04N 5/76* (2006.01)

(52) U.S. Cl.
   CPC .............. *H04N 7/147* (2013.01); *H04N 5/76* (2013.01); *H04N 7/148* (2013.01)

(58) Field of Classification Search
   CPC combination set(s) only.
   See application file for complete search history.

(56) References Cited

U.S. PATENT DOCUMENTS

| | | |
|---|---|---|
| 6,542,602 B1 | 4/2003 | Elazar |
| 6,959,079 B2 | 10/2005 | Elazar |
| 2009/0157746 A1* | 6/2009 | More ................... G06Q 10/06 |
| 2010/0064215 A1 | 3/2010 | Portman et al. |
| 2010/0174992 A1 | 7/2010 | Portman et al. |
| 2014/0149488 A1 | 5/2014 | Bialy et al. |
| 2014/0280431 A1 | 9/2014 | Shelest et al. |
| 2014/0341528 A1* | 11/2014 | Mahate ................. G11B 27/32 386/224 |
| 2015/0189078 A1 | 7/2015 | Sittin et al. |

* cited by examiner

*Primary Examiner* — Joseph J Nguyen
(74) *Attorney, Agent, or Firm* — Pearl Cohen Zedek Latzer Baratz LLP

(57) ABSTRACT

Methods and systems are described for recording screen data and audio data relating to a call. The screen recording session is initiated and terminated within the controller, based on correlation between audio data and screen data from the call, without requiring involvement with a controller or Computer Telephony Integration (CTI) layer.

14 Claims, 7 Drawing Sheets

CALL RECORDING WITH SCREEN AND AUDIO CORRELATION

FIELD OF THE INVENTION

The present invention relates generally to the recording of information transmitted over a network. In particular, embodiments of the invention relate to recording and correlating agent screen information and audio information from a call such as may be received in a call center.

BACKGROUND OF THE INVENTION

Current developments in Computer Telephony Integration (CTI) leverage a broad array of contact center applications and flexible call-handling capabilities. In addition, contact channels have expanded from voice to include other applications such as email, web, fax and the like. A full recording of customer-agent interactions in this context requires recording the agent screen data visible to the agent during an interaction in addition to the audio data of the interaction.

Screen recording requires significant amounts of storage and ongoing synchronization between the agent screen recorded activity and audio data from the interactions. A significant challenge in this context is determining when to initiate and stop the recording. Conventionally, the only ability to detect screen activity and to record and correlate the screen activity with audio data is based on external controller availability. This may involve a dedicated service that translates the computer telephony integration (CTI) events received from the call exchange (PBX) and converts them to screen recording commands to start and stop recording.

SUMMARY

In view of the foregoing, an object of the invention is to facilitate the efficient starting and stopping of agent screen data recording and to correlate screen and audio data without involving CTI. These and other objects of the invention are achieved with, according to one embodiment, a method for recording both audio data and agent screen data from a call received in a call center, which in one aspect, comprises receiving audio data in a recorder; initiating an audio data record session in an audio recording component of the recorder; building a correlation object correlating the audio data with agent screen data in a capture control module; initiating an agent screen data record session with the capture control module based on the audio data received in the recorder; stopping the audio data record session; and stopping the agent screen data record session after a predetermined wrap-up time; and storing correlated audio data and agent screen data.

A system according to one embodiment of the invention may include: an audio recorder; an agent screen recorder; and a processor running or executing a capture control module configured to initiate and stop audio data recorder sessions and agent screen data recorder sessions responsive to received audio data without computer telephony integration (CTI) control of the agent screen recorder.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the drawings.

DETAILED DESCRIPTION

Figure 1:
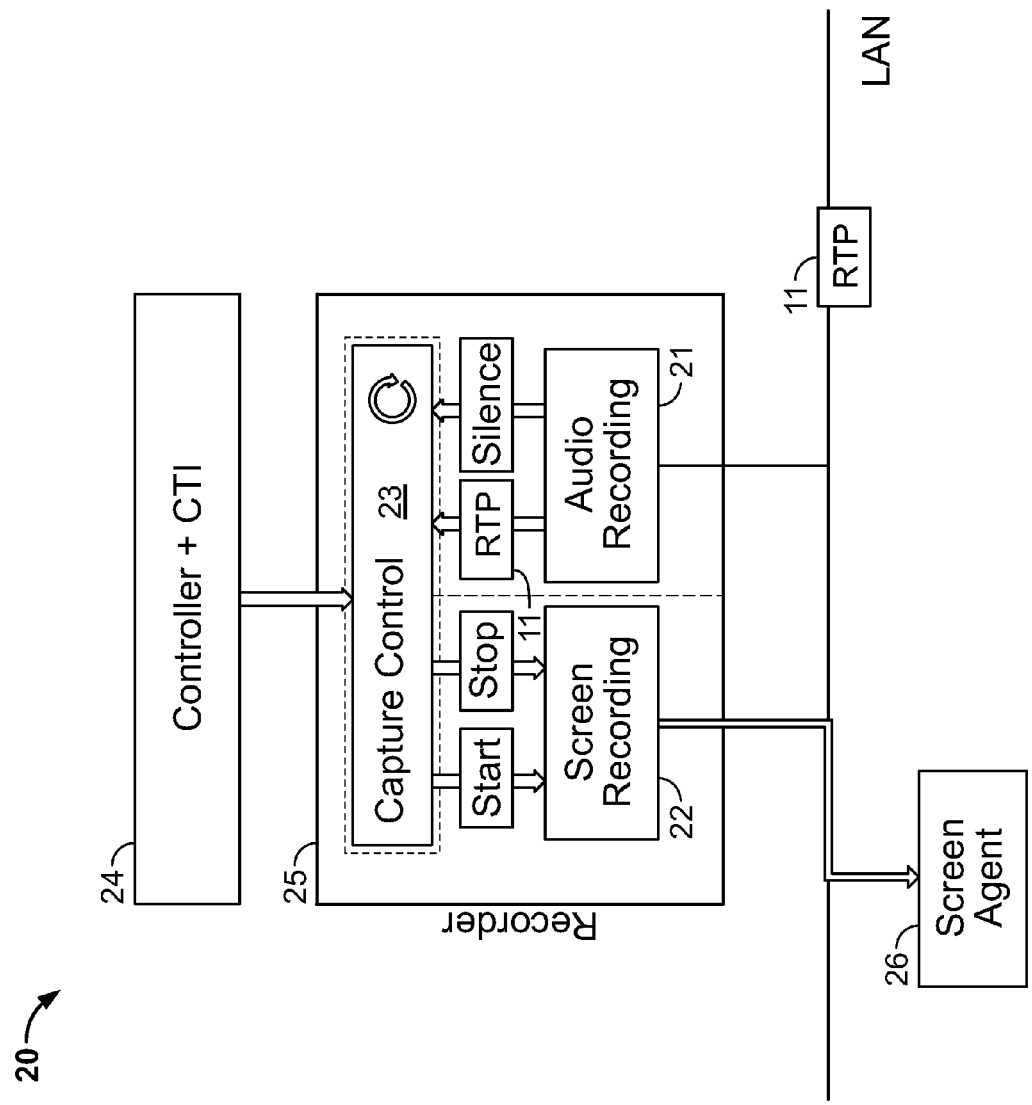
FIG. 1 is a block diagram illustrating the triggering of audio and screen recording from the capture control module according to one embodiment.

The description that follows provides various details of exemplary embodiments. However, this description is not intended to limit the scope of the claims but instead to explain various principles of the invention and the manner of practicing it.

The following definitions are provided of certain terms that will be used below.

An "agent" may be identified to the system in advance by a unique device identifier (UDI) or directory number (DN), and is able, using agent login information to access an "agent screen" on which "agent screen data" is displayed. The agent screen data may be correlated to audio data for the same call. Unless expressly stated otherwise in context, "agent screen data" and "screen data" are used interchangeably to refer to the screen session viewed by an agent during a call.

A "call" as used herein may be any communication between a customer and one or more agents, over a communication network, for example conventional or cellular telephone, voice communication via computer, voice chat, or other methods. The routing of a call may be controlled by a call exchange such as such as a Private Branch Exchange (PBX). A "call" may be for example a voice call, e.g., voice over internet protocol (VoIP). It should be noted also that a "call" may include a flow of real time protocol (RTP) packets from a user endpoint to the recorder, or a "call" may be a two-way (bi-directional) or multi-path interaction between two or more parties where there is a multi-path "conversation" or flow of RTP packets from each of the multiple user endpoints to the recorder. Embodiments of the invention are particularly concerned with a call having related agent screen data in addition to audio data, although agent screen data generally is not transmitted between parties to a call.

"Data" relating to a call as used herein may include "content data" and "metadata". The content data may include for example the data that is exchanged between parties to a call, such as but not limited to audio data, and related agent screen data. "Metadata" may be for example information other than content data which relates to the call and/or content such as but not limited to start time, stop time, identities of parties, route of call, file name and filepath of location of content data, IP addresses, and more, as will be described by reference to specific examples.

The term "session" is used to describe a data file created by a recorder based on data (e.g. RTP packets received by the recorder in the case of audio data). Thus, the recorder stores a session, or data file, relating to each call. It is possible for more than one session to be associated with a call, in which case each session comprises a subset of the content data sent to or from an endpoint during a call. It is possible to create separate sessions, one for the transmit stream and one for the receive stream, for example. Audio and screen data from the same call may be recorded in separate sessions.

Aspects of the invention are applicable to a communication system include at least one endpoint configured to initiate or terminate a call (or both), and a recording system configured to record call content data from multiple endpoints. A customer and an agent of the call center may be respective "endpoints". Recording of content data may be initiated automatically at the recording system upon receipt of content data from the endpoint. This is particularly useful when the recording system is configured for total recording of content data sent to and from the endpoint. The recording system need not wait for a signal from a controller to initiate recording. Instead the receipt of call content, e.g. a data packet with call content, triggers the recording of call content by the recording system.

Reference is made to an embodiment described in FIG. 1, wherein recorder 25 includes audio recorder 21 and agent screen recorder 22. Agent screen recorder 22 is adapted to record the data of a screen viewed by an agent during a call; the agent screen data is not exchanged between parties to a call, but is viewable by the agent. RTP packet(s) 11 received in audio recorder 21 are also received in capture control module 23, which initiates an audio record session.

Figure 7:
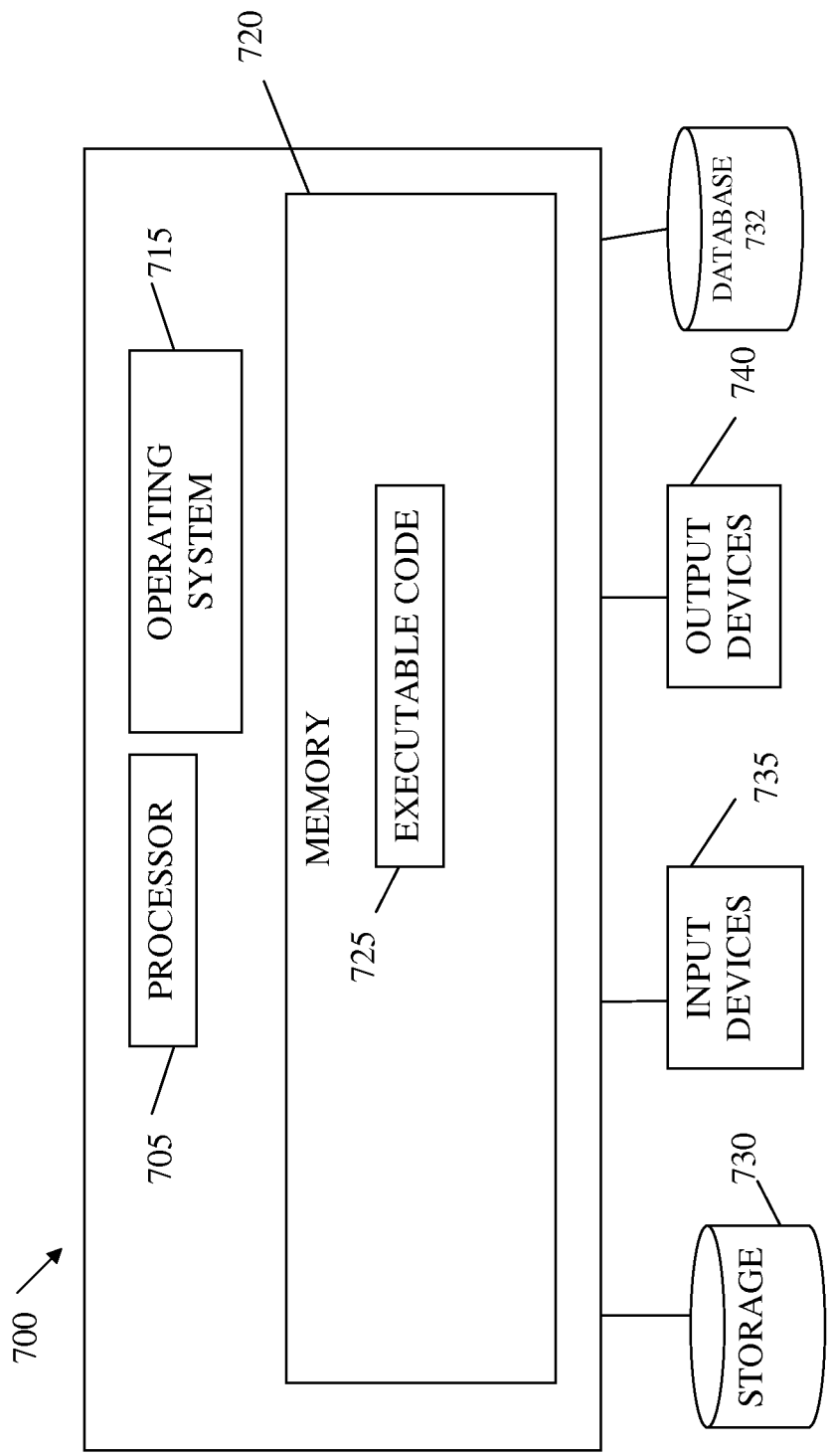
FIG. 7 is a block diagram showing a computing device according to an embodiment of the invention.

FIG. 7 shows a high level block diagram of an exemplary computing device according to embodiments of the present invention, such as may be used to implement CCM 23, Audio Recorder 21, Screen Recorder 22 and other modules. Each such computing device 700 may include a computer processor 705 that may be, for example, a central processing unit processor (CPU), a chip or any suitable computing or computational device, an operating system 715, a memory 720, storage 730, and databases 732, as well as a related input device(s) 735 and output device(s) 740. Typically the term storage 730 refers to a device that stores data, such as calls, movies, big data, etc.), while the terms database 732 refers to a device that stores metadata. As with any software solution that manages states and metadata, both controller 24 and recorder 25 use an external database to store metadata.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data or code used by methods according to embodiments of the invention may be stored in storage 730 and may be loaded from storage 730 into memory 720 where it may be processed by processor 205.

Input devices 735 may be or may include a mouse, a keyboard, a touch screen or pad or any suitable input device. Output devices 740 may include one or more displays, speakers and/or any other suitable output devices. Any applicable input/output (I/O) devices may be connected to computing device 700 as shown by blocks 735 and 740

Capture control module 23 includes a computing device 700 as described above running software adapted to execute instructions, to initiate and stop an agent screen data record session based on the RTP packets 11 received in recorder 21, without requiring input from controller 24 as described below. A screen data record session may include text and images provided to the agent screen and viewed by the agent during a call. Likewise, a period of silence 16 received in the audio recorder 21 and capture control module 23 may trigger capture control module (CCM) 23 to initiate and terminate agent screen recording sessions in screen recorder 22. Controller 24 may be or include one or more computer controllers or processors 705. Controller 24 and other units herein (e.g. control module 23) may be configured to carry out all or part of the methods disclosed herein by for example including circuitry configured to perform certain operations and/or by being connected to a non-transitory storage medium, memory or storage device including instructions or software which when executed carry out methods according to embodiments of the invention. While certain modules and controllers are described herein as performing certain tasks, in other embodiments, other controllers and other modules can perform different tasks of aspects of those tasks.

CCM 23 maintains screen data in a dedicated file in a storage medium 730. CCM 23 maintains a correlation between saved screen data and audio data with a correlation object, as described below, and may update screen recorder module 22 or the agent screen 26 with this information. "Correlation" in this context may mean that audio data and screen data belong to the same or related sessions. The identification of audio data and screen data as belonging to the same or related sessions is defined in a correlation object. "Correlating" may refer to the act of identifying and relating audio data and screen data.

Figure 2:
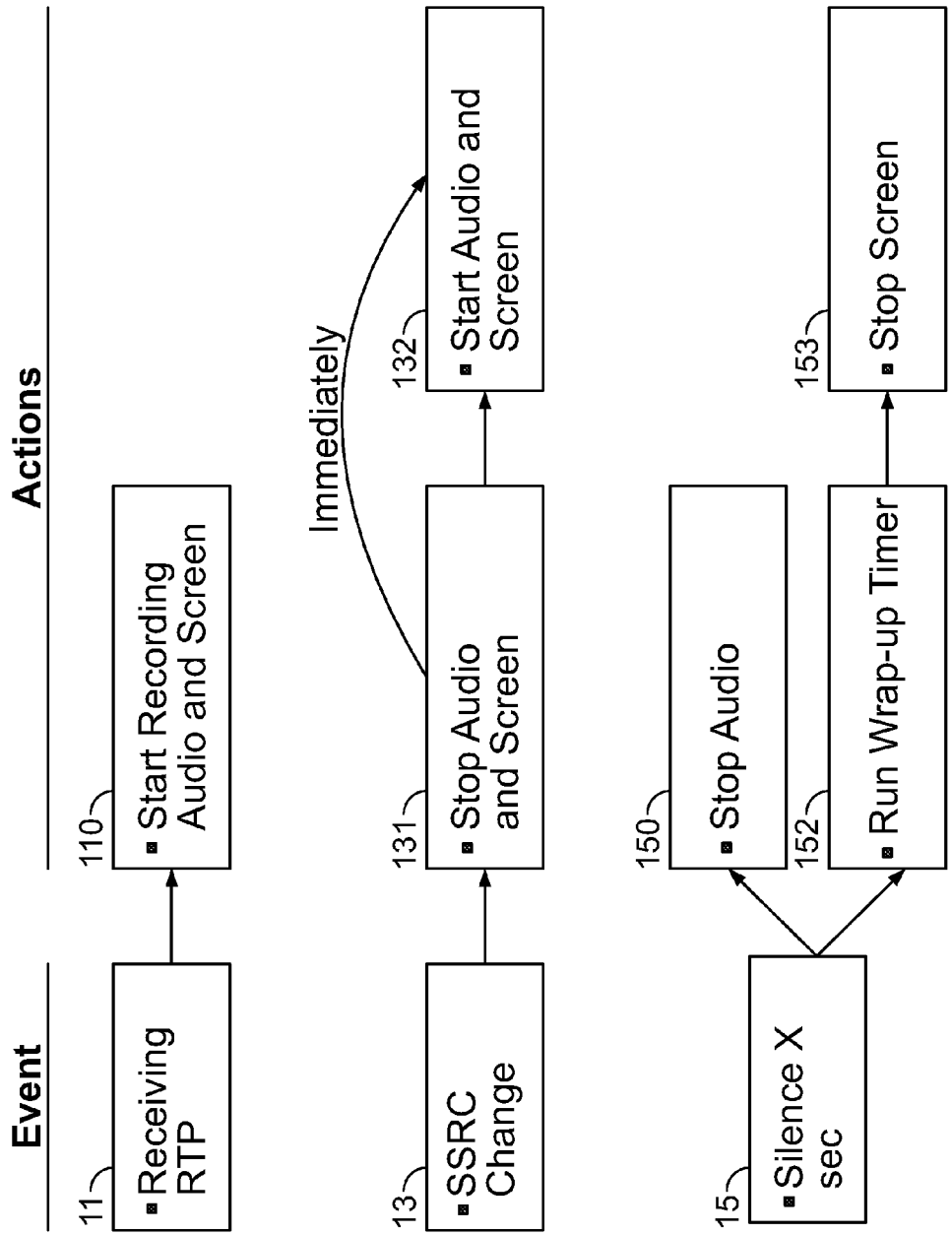
FIG. 2 is a block diagram depicting different modes for starting and stopping audio and screen recording according to embodiments of the invention.

FIG. 2 depicts the primary modes for initiating and stopping one or more audio record session(s) and agent screen data record session(s) according to one embodiment. As shown in FIG. 2, an audio record session and an agent screen record session may be initiated simultaneously or concurrently in step 110 upon receipt of first time RTP 11 in CCM 23 from the PBX or another telecommunications system. Alternatively, upon a change of identification data, such as a change in synchronization source "SSRC" identifier 13, the CCM may terminate audio and screen record sessions at step 131 and immediately start new sessions at 132. In another alternative, a predetermined period of audio silence 15 (typically, but without limitation, between 2 and 60 seconds), will cause CCM to stop an audio record session 150, and then stop or terminate an agent screen record session 153, counting a predetermined wrap-up time or period 152 after the stopping or terminating of the audio record session (said wrap-up time or period also being typically, without limitation, between 2 and 60 seconds).

Figure 3:
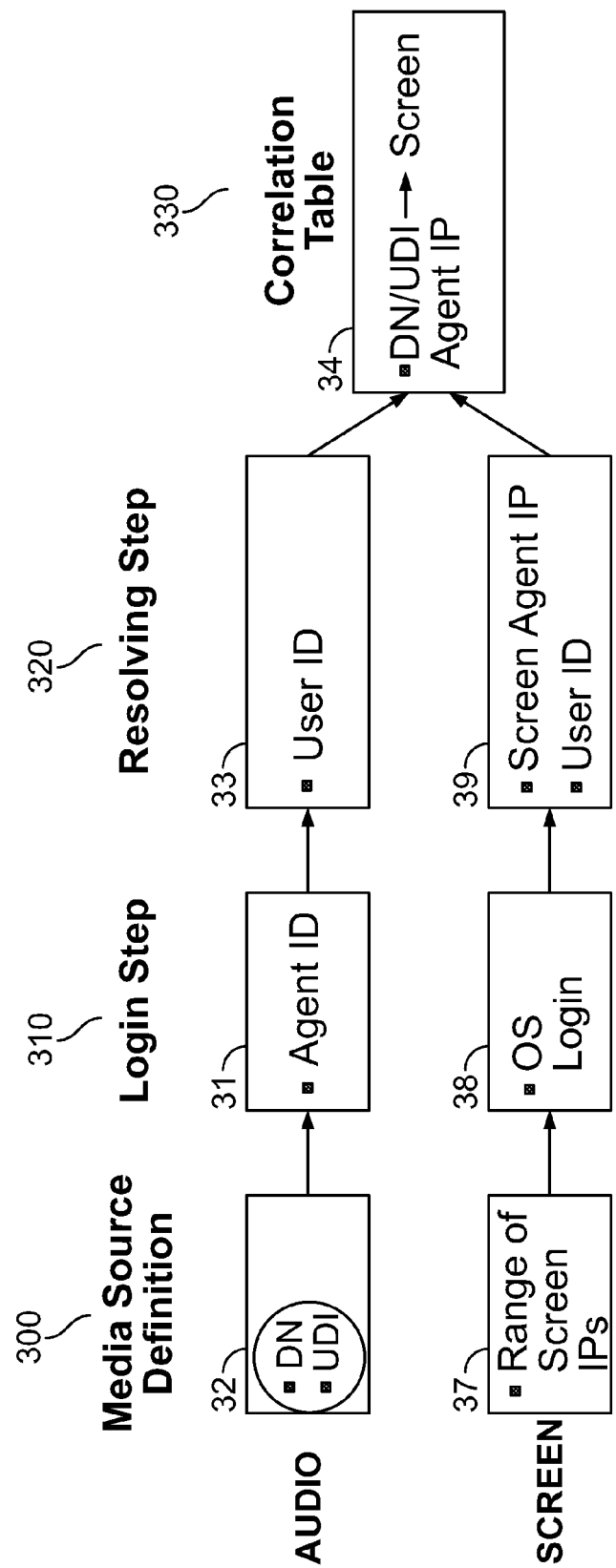
FIG. 3 is a block diagram illustrating the correlation of audio and screen data sources according to one embodiment.

FIG. 3 depicts steps for building a correlation object 330 correlating screen data and audio data sources according to an embodiment of the invention. Unique source attributes for audio data and screen data are identified at 300. For example, an agent logging in to the system by telephone will be identified to the system by unique device identifier (UDI) or directory number (DN) at 32 or by the agent himself or herself during a login step 310 using agent identification (ID) 31. These UDI, DN or Agent ID identification credentials are known to the system in advance, and may be associated with a system user ID 33, and these credentials, for example may be used to map an audio recording to a CTI call. Whether the system user ID is obtained from the UDI or DN depends on how the agent logs in. Screen data media source identification, meanwhile, occurs where an agent logs into the system at a workstation IP address 37 or from operating system login 38. The system finds relevant User ID 39 and this information is used to build correlation table or object 330, such as Table 1 below, which maps the audio information from the call, identified by DN/UDI to the agent screen IP, specifying for example whether the session is active and specifying the predetermined wrap-up time to terminate the screen session after the audio session is ended. An example correlation object template is provided in Table 1.

TABLE 1

| Name | Data Type |
| --- | --- |
| RequestID | Long Integral |
| Media Type | Short Integral |
| UDI | String |
| DN | String |
| Active | Boolean |
| ScreenIP | String |
| WrapUpTime | Date/Time |

Other or different information may be used. The CCM may retains correlation table information.

Content data relating to different calls to and from an endpoint may be separately recorded. One way of achieving this is through use of a file structure. However other methods of separating content data will be familiar to those skilled in the art. Content data relating to a call may be divided into "sessions". There may be more than one session relating to a call. For example, multiple sessions relating to a call may be separated by periods of silence. Thus the recording system may initiate a new session automatically upon a change of identification data, such as a synchronization source "SSRC" identifier in the received call content data. Additionally or alternatively a new session may be initiated when content data is received after a predetermined period of not receiving call content data (a silent period of minimum length), e.g. by receiving no data packets or packets with no content. The recording system may hold a separate file relating to each session.

As noted above, some embodiments may record content data relating to different calls in a file structure. Metadata relating to calls for which content is recorded may also be stored at the recording system. The metadata may be stored in a database structure. At least some of the metadata may be supplied to the recording system from a controller which in turn may have received it from a separate, possibly third party source or device over a network e.g. from a call exchange such as a private branch exchange "PBX" which controls the establishment of calls between endpoints. This metadata may be in the form of CTI messages.

The content of a call may be divided, for example by a period of silence or a change in identification data, e.g. RTP packet identification data. Therefore there may be more than one recording session associated with a call. On the controller side a recording may be created for each call and preferably for each session. The recording may comprise interaction and recording metadata relating to each session, and no content. The interaction metadata may be reported to the controller by the call exchange without any content data, the content data being routed directly to the recording system by the endpoint. In this instance, content data is not routed to the controller at all. Each recording may comprise additional metadata related to each session which is not stored at the recording system.

The controller of a system according to embodiments of the invention may be configured to receive from a call exchange at least some of the metadata relating to calls to and from the endpoint, receive notifications relating to call content from the recording system, and match the metadata to the notifications.

Figure 4:
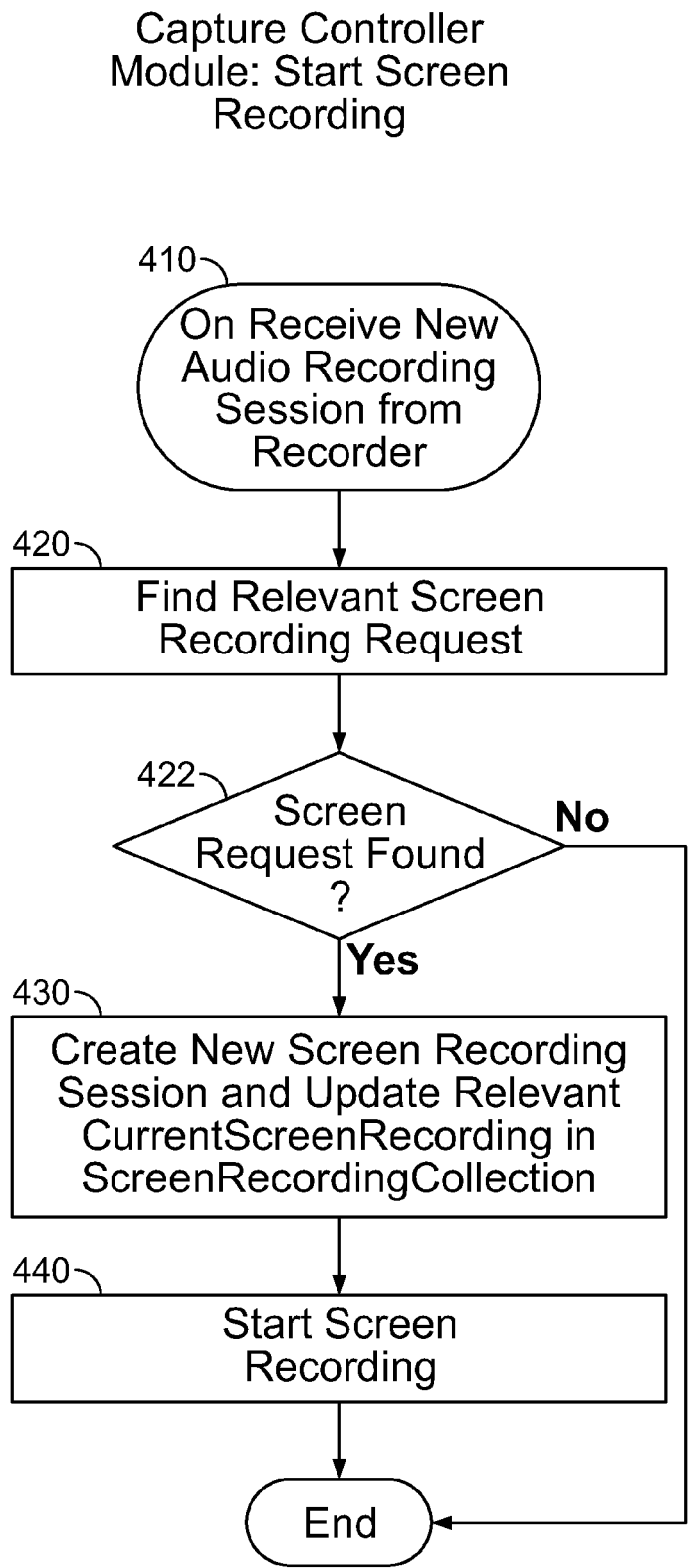
FIG. 4 is a flow chart showing a sequence to start screen recording when a new audio recording session is received in the capture control module according to an embodiment of the invention.
Figure 5:
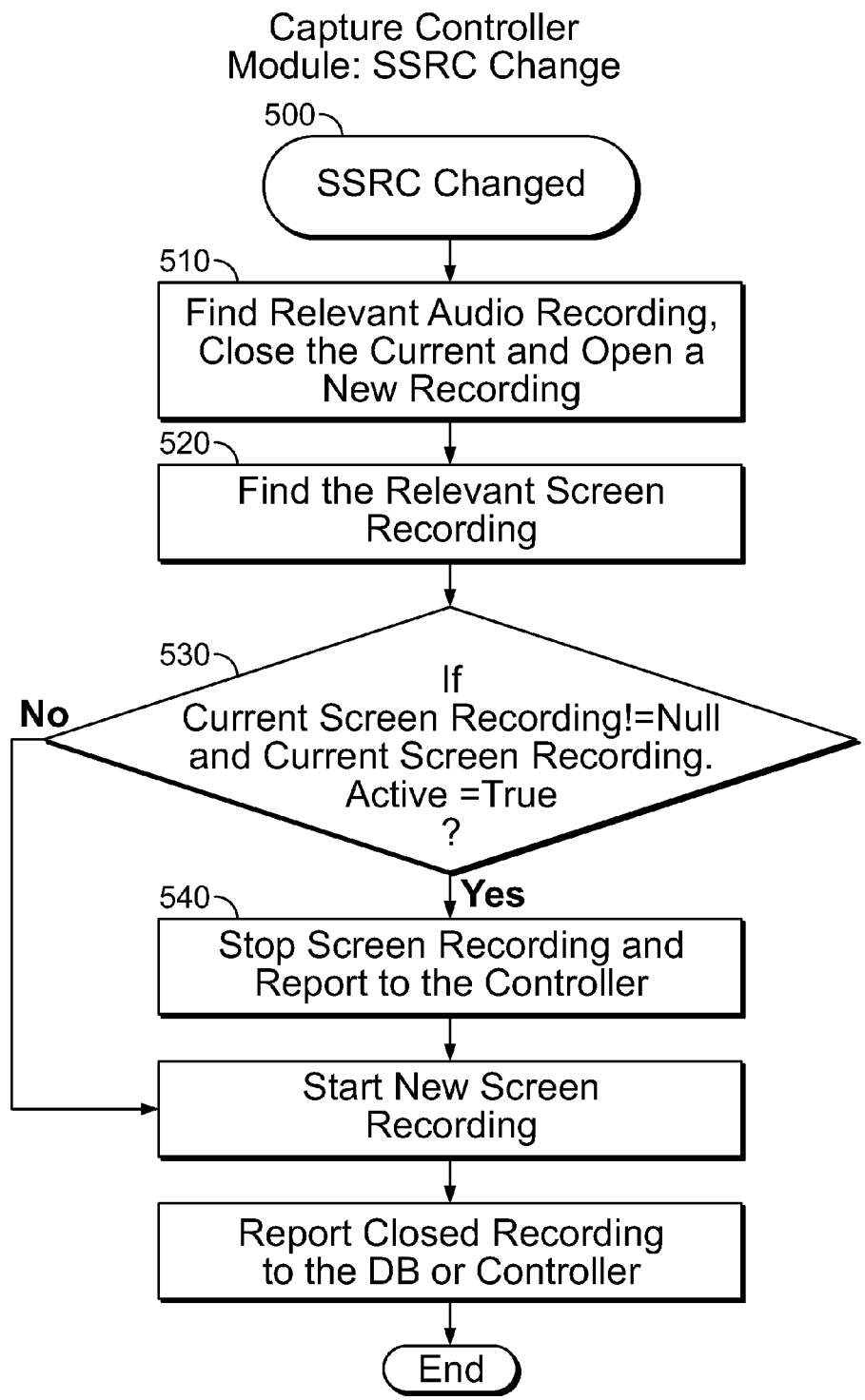
FIG. 5 is a flow chart showing a sequence to open a new screen recording session based on SSRC changes according to an embodiment of the invention.
Figure 6:
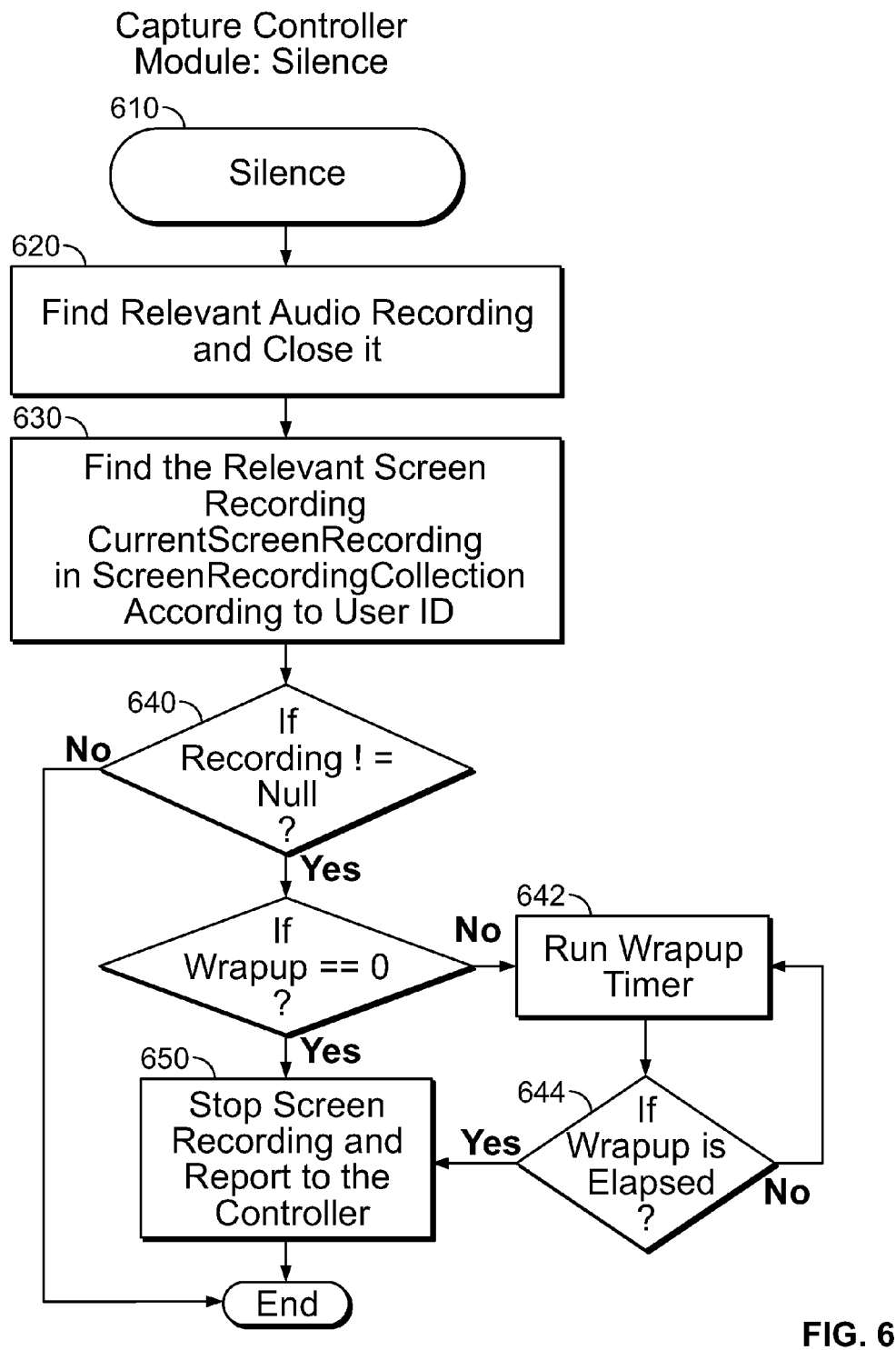
FIG. 6 is a flow chart showing a sequence to close a screen recording session after a period of silence according to an embodiment of the invention.

Turning now to FIG. 4, FIG. 5, and FIG. 6 in detail, which depict sequences of events for call recording according to embodiments of the invention, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice. In addition, the particular structure described herein need not be used; other sets of controllers, modules, etc. may be used and the functionality described herein divided in different ways in other embodiments.

It is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

It should be noted further that the invention has been described in the context of agent screen data and audio data, where the agent is in a call center and the customer is a customer of the call center. In this embodiment, the screen data is exclusively agent screen data. However, a customer screen may also be identified to the system, and customer screen data may also be included in a call. Therefore, the invention may be construed to encompass correlation of audio data with screen data, including customer screen data and/or agent screen data.

It is advantageous to provide a system in which recording is possible independently of the controller 24 so that, for example, recording is possible when the controller 24 is off line. In the following there is described a method in which the recording system 25 behaves independently of controller requests. That is, conventionally, a controller may be used to translate signalling CTI events into recording requests to start and stop recording. In embodiments according to the invention, the capture control module according to the invention starts and stops screen recording based only on RTP packets. Thus, receiving audio data in a recorder triggers audio recording and screen recording with a common decision mechanism through a capture control module in the recorder, without relying on translated CTI instructions.

Recorder 25 receives RTP packet(s) 11 and creates a data file for each session between an agent and a customer which is stored along with interaction metadata in storage 730 and/or database 732. The interaction metadata may be stored in a database that is linked to the file structure. As is known in the art, the controller 24 typically receives information relating to a call from the PBX. Controller 24 may include an associated database that stores only interaction metadata. This database in some embodiments does not store content of the RTP packets, e.g. audio information. More specifically, the database stores only full interaction metadata, i.e. without the content of RTP packets, for future application usage (evaluation, different queries etc.). Database 732 may be used also for storing part of the metadata allowing playback and archiving. One of the purposes of storing interaction metadata in a database is to facilitate the searching of content data stored in files in the recorder 25.

FIG. 4 depicts an embodiment wherein CCM 23 receives an audio recording request (410), including screen IP and DN/UDI information, from the controller and maintains or stores the same in a correlation table. When the voice call is initiated, CCM determines if a relevant request for screen recording session exists corresponding to that DN/UDI information (420). If yes (422), the CCM initiates screen recording and updates the status of Current.Screen.Recording.Active to equal "TRUE" (430). Screen recording is initiated and screen session metadata is transmitted to the controller if available (440). If a corresponding screen request is not found, then a screen session is not initiated.

Another mode of starting and stopping the screen data recorder is based on a change in SSRC identifier. As is known in the art, each RTP packet has inserted into its header a list of synchronization source "SSRC" identifiers of the sources that contributed to the generation of that packet. In the embodiment shown in FIG. 5, the recorder creates audio and screen session files based on SSRC changes. This method may operate according to for example the following rules:

when RTP SSRC is changed (500) and CCM 23 closes and opens an audio session (510) in audio recorder, CCM 23 looks for a related screen recording according to UDI/DN (520) in for example variable ScreenRecordingCollection;

if a relevant record is found (i.e., CurrentScreenRecording.DN equals NULL and CurrentScreenRecording.Active equals TRUE (530)), the CCM 23 instructs screen recorder 22 to stop recording and report to controller 24 (540);

if a relevant record is not found a new screen recording session is initiated (550); a closed recording session (560) is reported to a database in the CCM 23 or to the controller 24.

FIG. 6 shows an alternative sequence for closing audio and screen files upon silence, allowing a predetermined wrap-up time or period after closing an audio file to close the screen recorder. In this context "Silence" (610) means the absence of an RTP packet in a stream in the audio recorder, or RTPs having null values. As shown in FIG. 6, CCM closes an audio recording session (620) based on silence and CCM searches for a relevant screen recording based on UDI/DN (620). Thereafter:

If a screen recording is found (!=null) (640) and Current Screen Recording.WrapUpTime is greater than zero (646), the system runs or executes a wrap-up timer (642) and the screen recording session is terminated and reported to the controller (650).

It will be seen from the foregoing that the recorder operates according to a deterministic algorithm for creating files based on SSRC data only, or silence, without the controller intervening. It should be noted that the session files (data files) can be closed in other circumstances than those given above such as when failures occur.

Example 1

Embodiments of the invention may be further understood with reference to a non-limiting example in which an audio record session and screen record session are initiated and terminated without involvement of CTI. In this case, a directory number (DN) is used to identify audio data source.

In the Example, the following variables have the definitions set forth in Table 2:

TABLE 2

| Variable Name | Description |
| --- | --- |
| CurentScreenRecording | Structure that holds information about screenrecording request and status. |
| ScreenRecordingCollection.Add | Describes an action of adding a new "CurentScreenRecording" request to the collection. |
| ScreenRecordingCollection | Collection that holds all "CurentScreenRecording" requests. |
| CurentScreenRecording.ScreenIP | Specific CurentScreenRecording data member: The IP of the screen device that needs to be recorded. |
| CurentScreenRecording.DN | Specific CurentScreenRecording data member: The resolved Directory Number (DN) of the agent associated with an agent screen recording and voice recording. |
| CurentScreenRecording.Active | Specific CurentScreenRecording data member: Indication whether session recorded or not. |
| WrapUpTime | Specific CurentScreenRecording data member: holds the number of seconds for required wrap up time for this screen recording call. |

To start the recording session(s), the CCM obtains a recording request for screen recording from the Controller (CurentScreenRecording) and builds a correlation table, for example as set forth in Table 3:

TABLE 3

| RequestID | 1 |
| --- | --- |
| Media Type | Screen |
| DN | 1 |
| Active | False |
| ScreenIP | 201.202.203.204 |
| WrapUpTime | 30 sec |

The CCM saves the data in ScreenRecordingCollection (ScreenRecordingCollection.Add (CurentScreenRecording));

On SSRC change for voice recording of user 1, CCM looks for ScreenRecordingCollection (where DN=1);

CCM sends request to Screen Recording module (IP=CurentScreenRecording.ScreenIP=201.202.203.204);

Screen recording module starts recording and sends recorded session ID to the CCM and to the controller.

To end the recording session, in the case of a period of silence, for example, the following sequence may be followed:

CCM stops voice recording of DN 1 after a predetermined period of silence;

CCM searches ScreenRecordingCollection for the active screen recording (CurentScreenRecording.DN=1 and CurentScreenRecording.Active=true);

Once CCM finds an active screen recording session it checks CurrentScreenRecording. WrapUpTime >0 (for example, 30 seconds)

Thereafter, CCM runs or operates the timer (e.g., counts the time elapsed). And after (for example) 30 seconds, the timer function sends Stop record request to Screen Capturing module, it stops screen recording and sends notification to CCM and the controller.

Active flag is set to false, i.e., CurentScreenRecording.Active=false

In the foregoing and the following there are several mentions of configurable time limits, e.g. 1 second. This time period can be varied (configured) according to the implementation of the method or system. The actual time periods chosen may depend on customer site conditions for example.

It should be noted in the foregoing that the recorder sends notifications, also known as update messages to the controller without being requested to do so by the controller. The recorder may have its own internal management mechanism for the sending of such updates such as silence and SSRC events, which the controller can match with information it holds.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Thus an embodiment of the invention may take the form of one or more computer readable media comprising instructions which when executed on one or more processors in a computing system cause the system to implement any of the methods described above.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, operations or integers or groups thereof and that the terms are to be construed as specifying components, features, steps, operations or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable although flow diagrams may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of recording both audio data and agent screen data from a call received in a call center, the method comprising:
receiving audio data in a recorder;
initiating an audio data record session in an audio recording component of the recorder;
building a correlation object correlating the audio data with agent screen data in a capture control module;
initiating an agent screen data record session with the capture control module based on the audio data received in the recorder;
stopping the audio data record session;
stopping the agent screen data record session after a predetermined wrap-up time; and storing correlated audio data and agent screen data;
wherein initiating an agent screen data record session comprises identifying a changed synchronization source identifier (SSRC) in the audio capture control module, finding an audio record session related to the changed synchronization source identifier (SSRC) and an agent screen record session related to the relevant audio session, and (i) stopping the audio data record session and stopping the agent screen data record session, and starting a new audio data record session and a new agent screen data record session when the related agent screen record session is active; and (ii) initiating a new audio data record session and a new agent screen data record session when the related agent screen record session is not active.

2. The method according to claim 1, wherein receiving audio data comprises receiving a first real time protocol (RTP) data from a private branch exchange (PBX) network and initiating said audio data record session and agent screen data record session upon receiving said first real time protocol (RTP) data in said recorder.

3. The method according to claim 1, wherein initiating an agent screen data record session comprises receiving an agent screen record request from the capture control module upon receipt of a new audio data, and initiating a new agent screen data record session when the agent screen record request is found.

4. The method according to claim 1, wherein initiating an agent screen data record session comprises identifying a changed synchronization source identifier (SSRC) in the capture control module, finding an audio record session related to the changed synchronization source identifier (SSRC) and an agent screen record session related to the changed synchronization source identifier (SSRC), and
  (i) stopping the agent screen data record session and starting a new agent screen data record session when the relevant agent screen record session is active; and
  (ii) initiating a new agent screen data record session when the relevant agent screen record session is not active.

5. The method according to claim 1, wherein a period of silence in the audio data received in the recorder triggers stopping the audio data record session and stopping the agent screen data record session a specified period of wrap-up time after stopping the audio data record session.

6. The method according to claim 1, wherein the correlation object correlates between an agent unique device identifier (UDI) or directory number (DN) or an Agent ID mapping to the audio data record session, and an agent screen Internet Protocol (IP) address mapping to the agent screen data record session.

7. A call recording system configured to record one or both of the following: audio data and/or agent screen data, comprising:
  an audio recorder;
  an agent screen recorder; and
  a processor executing a capture control module configured to initiate and stop audio data recorder sessions and agent screen data recorder sessions responsive to received audio data without computer telephony integration (CTI) control of the agent screen recorder, wherein
  the capture control module is configured to identify a changed synchronization source identifier (SSRC) in the recorder, find an audio record session related to the changed synchronization source identifier (SSRC) and find an agent screen record session related to the changed synchronization source identifier (SSRC); and
  (i) stop the audio data record session and the agent screen data recorder session and start a new audio data recorder session and a new agent screen data recorder session when the related agent screen data record session is active; and (ii) initiate a new audio data record session and a new agent screen data record session when the related agent screen data record session is not active.

8. The total call recording system according to claim 7, comprising a private branch exchange (PBX) network generating real time protocol (RTP) audio data to initiate and stop audio recorder sessions and agent screen recorder sessions.

9. The total call recording system according to claim 7, wherein the agent screen recorder is configured to receive a screen recording request from the capture control module upon receipt of new audio data, and if the screen recording request is found, start a new agent screen data record session.

10. The total call recording system according to claim 7, wherein the capture control module is configured to identify a changed synchronization source identifier (SSRC) in the recorder, find an audio record session related to the changed synchronization source identifier (SSRC) and find an agent screen record session related to the changed synchronization source identifier (SSRC); and
  (i) stopping the agent screen data recorder session and starting a new agent screen data recorder session when the relevant agent screen data recorder session is active; and
  (ii) initiating a new agent screen data recorder session when the relevant agent screen data recorder session is not active.

11. The total call recording system according to claim 7, further comprising a wrap-up timer, wherein a period of silence in the received audio data in the recorder triggers stopping the audio data recorder session and stopping the agent screen data recorder session after a specified period of time has elapsed in the wrap-up timer.

12. The total call recording system according to claim 7, further comprising a correlation object correlating between an agent unique device identifier (UDI) or directory number (DN) or an agent ID mapping to the audio recorder, and an agent screen internet protocol (IP) address mapping to the agent screen recorder.

13. A method of recording both audio data and agent screen data from a call received in a call center, the method comprising:
  receiving audio data in a recorder;
  initiating an audio data record session in an audio recording component of the recorder;
  building a correlation object correlating the audio data with agent screen data in a capture control module;
  initiating an agent screen data record session with the capture control module based on the audio data received in the recorder;
  stopping the audio data record session;
  stopping the agent screen data record session after a predetermined wrap-up time; and
  storing correlated audio data and agent screen data;
  wherein initiating an agent screen data record session comprises identifying a changed synchronization source identifier (SSRC) in the capture control module, finding an audio record session related to the changed synchronization source identifier (SSRC) and an agent screen record session related to the changed synchronization source identifier (SSRC), and (i) stopping the agent screen data record session and starting a new agent screen data record session when the relevant agent screen record session is active; and (ii) initiating a new agent screen data record session when the relevant agent screen record session is not active.

14. A call recording system configured to record one or both of the following: audio data and/or agent screen data, comprising:

an audio recorder;

an agent screen recorder; and a processor executing a capture control module configured to initiate and stop audio data recorder sessions and agent screen data recorder sessions responsive to received audio data without computer telephony integration (CTI) control of the agent screen recorder, wherein the capture control module is configured to identify a changed synchronization source identifier (SSRC) in the recorder, find an audio record session related to the changed synchronization source identifier (SSRC) and find an agent screen record session related to the changed synchronization source identifier (SSRC); and (i) stopping the agent screen data recorder session and starting a new agent screen data recorder session when the relevant agent screen data recorder session is active; and (ii) initiating a new agent screen data recorder session when the relevant agent screen data recorder session is not active.

* * * * *